United States Patent [19]

Takanashi et al.

[11] Patent Number: 5,029,956
[45] Date of Patent: Jul. 9, 1991

[54] OPTICAL SCANNER

[75] Inventors: Kenichi Takanashi, Yokohama; Akihisa Itabashi, Mitaka, both of Japan

[73] Assignee: Ricoh Company, Ltd., Tokyo, Japan

[21] Appl. No.: 467,507

[22] Filed: Jan. 19, 1990

[30] Foreign Application Priority Data

Jan. 23, 1989 [JP] Japan .................................. 1-13547
Mar. 7, 1989 [JP] Japan .................................. 1-54664
Mar. 7, 1989 [JP] Japan .................................. 1-54665
Oct. 6, 1989 [JP] Japan .................................. 1-261415

[51] Int. Cl.$^5$ .......................... G02B 26/08; H01J 3/14
[52] U.S. Cl. ..................................... 350/6.8; 250/236
[58] Field of Search .................... 350/6.3, 6.5–6.8, 350/418, 331 R, 355, 360; 250/236

[56] References Cited

U.S. PATENT DOCUMENTS 4,733,064  3/1988  Ishikawa ............................ 350/6.8

FOREIGN PATENT DOCUMENTS 151824  7/1987  Japan .

OTHER PUBLICATIONS

Japanese Patent Publication (KOKOKU) No. 1-15046, Mar. 15, 1989.
Japanese Patent Publication (KOKOKU) No. 1-15047, Mar. 15, 1989.
Japanese Patent Publication (KOKOKU) No. 1-14564, Mar. 13, 1989.

Primary Examiner—Bruce Y. Arnold
Assistant Examiner—James Phan
Attorney, Agent, or Firm—Oblon, Spivak, McClelland, Maier & Neustadt

[57] ABSTRACT

An optical scanner comprises a light source device; a linear image forming device for forming an approximately parallel light beam from the light source device as a linear image extending in a main scanning corresponding direction; a rotary polygon mirror having a deflection-reflecting face in the vicinity of the image forming position of the linear image; and an image forming optical system arranged between the rotary polygon mirror and a scanned face and setting the scanned face and a deflecting start point of the deflection-reflecting face in an approximately conjugate relation in geometrical optics with respect to a secondary scanning direction, the image forming optical system forming the deflected light beam from the deflection-reflecting face as an image of a light spot on the scanned face. The linear image forming device has a transparent elastic parallel plate, a cylindrical lens, a deforming device for flexing the elastic parallel plate in the shape of an arc by applying a deforming force thereto to change a radius of curvature of a face of the elastic parallel plate, and a controller for controlling the application of the deforming force in synchronization with an optically scanning operation by the deflected light beam. The linear image forming device may have other constructions.

8 Claims, 4 Drawing Sheets

θ = 33.9°

θ = 33.9°

REMAINING FIELD CURVATURE

θ = 33.9°

θ = 33.9°

DISPLACEMENT OF CYLINDRICAL LENS

θ = 33.9°

CHANGE IN bfcv AND WRITE OPTICAL POSITION

OPTICAL SCANNER

BACKGROUND OF THE INVENTION

1. Field of the Invention

The present invention relates to an optical scanner using a rotary polygon mirror.

2. Description of the Related Art

In an optical scanner, an approximately parallel light beam from a light source device is focused and formed by a cylindrical lens as a linear image extending in a main scanning corresponding direction and is deflected by a rotary polygon mirror having a deflection-reflecting face in the vicinity of an image forming position of this linear image. The deflected light beam is formed as an image in the shape of a light spot on a scanned face by an image forming optical system to perform an optical scanning operation. This optical scanner is well known in association with an optical printer, a laser facsimile, a digital copying machine, a laser photoengraving machine, etc.

As is well known, in the optical scanner using the rotary polygon mirror, there is a problem about the inclination of a reflecting face. To correct the inclination of the reflecting face in the optical scanner, the approximately parallel light beam from the light source device is focused and formed by the cylindrical lens as the linear image extending in the main scanning corresponding direction in the vicinity of the deflection-reflecting face of the rotary polygon mirror. A start point of the deflection by the deflection-reflecting face and the scanned face are arranged by the image forming optical system in an approximately conjugate relation in geometrical optics with respect to a secondary scanning direction.

Therefore, the image forming optical system becomes an anamorphic optical system having a strong power in the secondary scanning direction in comparison with that in the main scanning direction. Accordingly, when a curvature of a field in the main scanning direction is preferably corrected, a large field curvature tends to be caused with respect to the secondary scanning direction.

As mentioned above, the curvature of a field in the secondary scanning direction causes the diameter of the light spot for scanning the scanned face in the secondary scanning direction to change together with the position of the formed image. Further, the diameter of the light spot in the secondary scanning direction becomes uneven in a main scanning region, which is a great obstacle in realizing an optical scanning operation of high density.

There are various kinds of trials for correcting the above field curvature in the secondary scanning direction by a performance of the image forming optical system. However, these trials have the problems that it is very difficult to design the image forming optical system so as to satisfy the requirement of high density.

SUMMARY OF THE INVENTION

It is therefore an object of the present invention to provide a novel optical scanner for removing the curvature of a field in the secondary scanning direction easily and reliably and enabling an optical scanning operation of high density.

The above object of the present invention can be achieved by an optical scanner comprising a light source device; a linear image forming device for forming an approximately parallel light beam from the light source device as a linear image extending in a main scanning corresponding direction; a rotary polygon mirror having a deflection-reflecting face in the vicinity of the image forming position of the linear image; and an image forming optical system arranged between the rotary polygon mirror and a scanned face and setting the scanned face and a deflecting start point of the deflection-reflecting face in an approximately conjugate relation in geometrical optics with respect to a secondary scanning direction, the image forming optical system forming the deflected light beam from the deflection-reflecting face as an image of a light spot on the scanned face. The linear image forming device has a transparent elastic parallel plate, a cylindrical lens, deforming means for flexing the elastic parallel plate in the shape of an arc by applying a deforming force thereto to change a radius of curvature of a face of the elastic parallel plate, and control means for controlling the application of the deforming force in synchronization with an optical scanning operation by the deflected light beam.

The present invention also resides in an optical scanner comprising a light source device; a linear image forming device for forming an approximately parallel light beam from the light source device as a linear image extending in a main scanning corresponding direction; a rotary polygon mirror having a deflection-reflecting face in the vicinity of the image forming position of the linear image; and an image forming optical system arranged between the rotary polygon mirror and a scanned face and setting the scanned face and a deflecting start point of the deflection-reflecting face in an approximately conjugate relation in geometrical optics with respect to a secondary scanning direction, the image forming optical system forming the deflected light beam from the deflection-reflecting face as an image of a light spot on the scanned face. The linear image forming device has a transparent conductive high polymer film, a cylindrical lens integrally formed with the transparent conductive high polymer film, applying means for applying a voltage to the transparent conductive high polymer film, and control means for controlling the voltage applied by the applying means in synchronization with an optical scanning operation by the deflected light beam.

The present invention also resides in an optical scanner comprising a light source device; a linear image forming device for forming an approximately parallel light beam from the light source device as a linear image extending in a main scanning corresponding direction; a rotary polygon mirror having a deflection-reflecting face in the vicinity of the image forming position of the linear image; and an image forming optical system arranged between the rotary polygon mirror and a scanned face and setting the scanned face and a deflecting start point of the deflection-reflecting face in an approximately conjugate relation in geometrical optics with respect to a secondary scanning direction, the image forming optical system forming the deflected light beam from the deflection-reflecting face as an image of a light spot on the scanned face. The linear image forming device has a cylindrical lens formed by a transparent conductive high polymer material, applying means for applying a voltage to the cylindrical lens, and control means for controlling the voltage applied by the applying means in synchronization with an optical scanning operation by the deflected light beam.

The present invention also resides in an optical scanner comprising a light source device; a linear image forming device for forming an approximately parallel light beam from the light source device as a linear image extending in a main scanning corresponding direction; a rotary polygon mirror having a deflection-reflecting face in the vicinity of the image forming position of the linear image; and an image forming optical system arranged between the rotary polygon mirror and a scanned face and setting the scanned face and a deflecting start point of the deflection-reflecting face in an approximately conjugate relation in geometrical optics with respect to a secondary scanning direction, the image forming optical system forming the deflected light beam from the deflection-reflecting face as an image of a light spot on the scanned face. The linear image forming device has a cylindrical lens formed by sealing a transparent liquid into the interior of a transparent and flexible outer shell member, the cylindrical lens being deformed by an external deforming force so as to change a focal distance thereof, deforming means for applying the deforming force to the cylindrical lens by an electrical or magnetic operation, and control means for controlling the application of the deforming force in synchronization with an optical scanning operation by the deflected light beam.

Further objects and advantages of the present invention will be apparent from the following description of the preferred embodiments of the present invention as illustrated in the accompanying drawings.

DESCRIPTION OF THE PREFERRED EMBODIMENTS

Figure 1A:
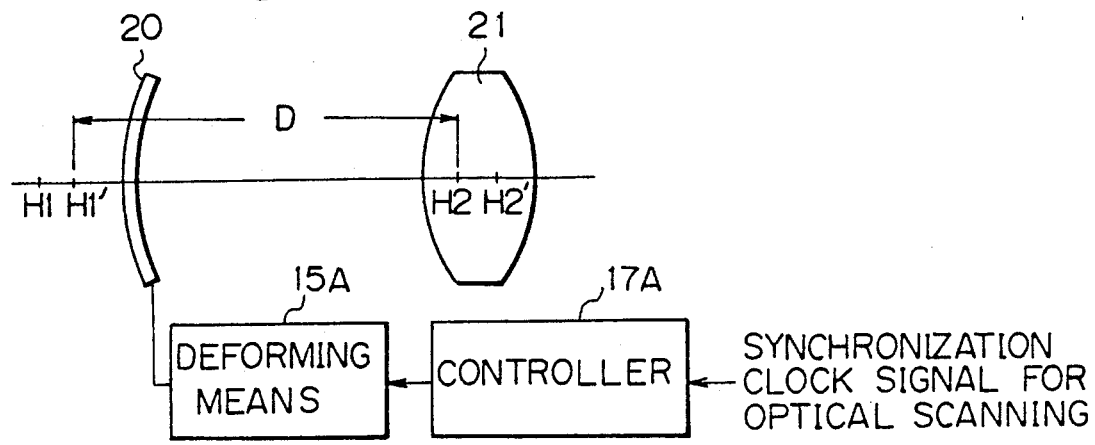
FIGS. 1a-1c, 2 to 4 are views for explaining the features of the present invention in association with first to fourth embodiments thereof.

The preferred embodiments of an optical scanner of the present invention will next be described in detail with reference to the accompanying drawings.

An optical scanner of the present invention can be applied to an optical printer, a laser facsimile, a digital copying machine, a laser photoengraving machine, etc. In first to fourth embodiments of the present invention described later, the optical scanner has a light source device, a device for forming a linear image, a rotary polygon mirror and an optical system for forming an image.

The light source device emits an approximately parallel light beam.

The device for forming the linear image forms the approximately parallel light beam from the light source device as a linear image extending in a main scanning corresponding direction.

The rotary polygon mirror has a deflection-reflecting face in the vicinity of an image forming position of the above linear image and reflects the light beam incident from the light source device through the linear image forming device. The reflected light beam is incident to the image forming optical system as a deflected light beam by the rotation of the rotary polygon mirror.

The image forming optical system forms the deflected light beam as an image in the shape of a light spot on a scanned face. At this time, a start point of the deflection by the deflection-reflecting face and the scanned face are arranged in an approximately conjugate relation in geometrical optics with respect to the secondary scanning direction so as to correct an influence on the inclination of a reflecting face in the rotary polygon mirror.

The features of the present invention reside in the device for forming the linear image.

Namely, in the first embodiment of the present invention, the linear image forming device has a transparent elastic parallel plate, a cylindrical lens, deforming means for flexing the elastic parallel plate in the shape of an arc by applying a deforming force thereto to change a radius of curvature of a face of the elastic parallel plate, and control means for controlling the application of the deforming force in synchronization with an optical scanning operation by the deflected light beam.

In the second embodiment, the linear image forming device has a transparent conductive high polymer film, a cylindrical lens integrally formed with the transparent conductive high polymer film, applying means for applying a voltage to the transparent conductive high polymer film, and control means for controlling the voltage applied by the applying means in synchronization with an optical scanning operation by the deflected light beam.

In the third embodiment, the linear image forming device has a cylindrical lens formed by a transparent conductive high polymer material, applying means for applying a voltage to the cylindrical lens, and control means for controlling the voltage applied by the applying means in synchronization with an optical scanning operation by the deflected light beam.

In the optical scanner in the third embodiment of the present invention, the transparent conductive high polymer material constituting the cylindrical lens of the image forming optical system is the same material as that of the transparent conductive high polymer film integrally formed with the cylindrical lens in the optical scanner in the second embodiment.

In the fourth embodiment, the linear image forming device has a cylindrical lens formed by sealing a transparent liquid into the interior of a transparent and flexible outer shell member, the cylindrical lens being deformed by an external deforming force so as to change a focal distance thereof, deforming means for applying the deforming force to the cylindrical lens by an electrical or magnetic operation, and control means for controlling the application of the deforming force in synchronization with an optical scanning operation by the deflected light beam.

The image forming optical system sets the start point of the deflection by the deflection-reflecting face and the scanned face in the approximately conjugate relation in geometrical optics with respect to the secondary scanning direction. Accordingly, an image provided by the above image forming optical system with respect to the linear image by the linear image forming device is formed on the scanned face with respect to the secondary scanning direction. When the image forming position of the linear image by the linear image forming device is changed on an optical path, the image forming position of the linear image by the image forming optical system is also displaced in accordance with a longitudinal magnification of the image forming optical system. By using this construction, the curvature of a field in the secondary scanning direction can be removed.

In the optical scanner in the first embodiment of the present invention, the linear image is focused and formed by a cylindrical lens and a transparent elastic parallel plate of the linear image forming device.

Figure 1B:
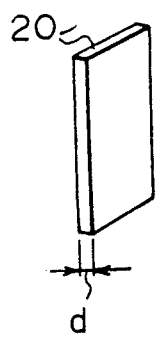
Figure 1C:
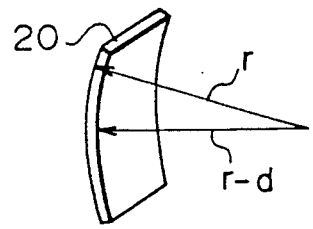

When a deforming force is applied to a transparent elastic parallel plate 20 as shown in FIG. 1b, the parallel plate 20 is flexed in the shape of an arc as shown in FIG. 1c. In this case, the parallel plate 20 has a convex face on one side thereof and a concave face on the other side thereof. When the thickness of the elastic parallel plate 20 is set to d as shown in FIG. 1b, the radius of curvature of the concave face is (r−d) when the radius of curvature of the convex face is set to r. In this state, the elastic parallel plate 20 functions as a cylindrical lens having a focal distance $f_1 = -1\ nr(r-d)/(n-1)$ where a refractive index of the material of the parallel plate is set to n.

In FIG. 1a, references numeral D designates a distance between main points of the flexed elastic parallel plate 20 and the cylindrical lens 21. Reference numerals H1, H1' designate main points of the elastic parallel plate 20. Reference numerals H2, H2' designate main points of the cylindrical lens 21. Therefore, the main point distance D is a distance between the main points H1' and H2 as shown in this figure. When the focal distance of the cylindrical lens 21 is set to $f_2$, a combined focal distance F of the elastic parallel plate 20 and the cylindrical lens 21 is provided by the following formula.

$$F = f_1 \cdot f_2 / (f_1 + f_2 - D) \quad (1)$$

When the $f_1$ is changed by the change in deforming force applied to the elastic parallel plate 20, the combined focal distance F is also changed and a change ΔF in this combined focal distance F is equal to a displacing amount of the above linear image. Therefore, in the optical scanner of the first embodiment, the curvature of a field is corrected by controlling the deforming force applied to the elastic parallel plate through the change in position of the formed linear image.

In the optical scanner of the second embodiment, a transparent conductive high polymer film is integrally formed with the cylindrical lens of the linear image forming device. This transparent conductive high polymer film is known in association with a transparent thin film speaker, etc. When a voltage is applied to this film, the film can be displaced in the thickness direction thereof.

Therefore, in the optical scanner of the second embodiment, the cylindrical lens of the linear image forming device is integrally formed with the transparent conductive high polymer film. The cylindrical lens is moved in the direction of an optical axis by utilizing the displacement of the transparent conductive high polymer film. By this movement, the image forming position of the linear image is displaced on the optical path.

In the optical scanner of the third embodiment, the cylindrical lens of the linear image forming device is constructed by a transparent conductive high polymer material used in the optical scanner of the second embodiment. The cylindrical lens is moved by applying a voltage to this material so that the image forming position of the linear image is displaced on the optical path.

In the optical scanner of the fourth embodiment, the linear image is formed by the cylindrical lens of the linear image forming device. This cylindrical lens is constructed by sealing a transparent liquid into the interior of a transparent and flexible outer shell member. The focal distance of the cylindrical lens can be changed by the deformation thereof caused by the action of a deforming force applied from the exterior of the scanner. Accordingly, the image forming position of the linear image is changed by the change in focal distance caused by the external deforming force.

In the optical scanners of the first to fourth embodiments, the image forming position of the linear image is controlled in synchronization with the optically scanning operation by the deflected light beam so as to remove the curvature of a field in the secondary scanning direction caused by the image forming optical system.

The concrete description of the embodiments of the present invention will next be described in detail with reference to the accompanying drawings.

Figure 5:
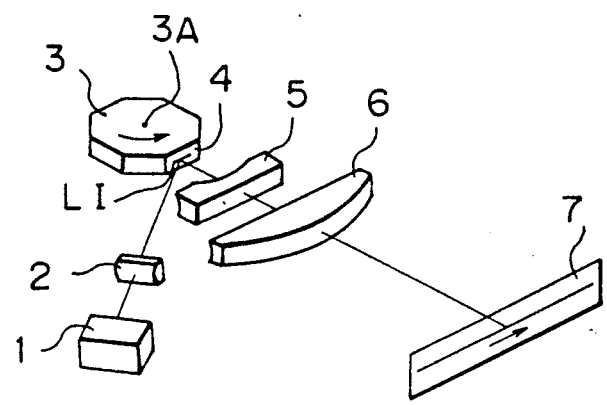
FIG. 5 is a view for explaining an optical scanner to which the present invention can be applied.

FIG. 5 shows only a main portion of an optical scanner to which the present invention can applied.

A light source device 1 is composed of a light source, or the light source and a collimator lens system, and emits an approximately parallel light beam. In this embodiment, a semiconductor laser is assumed to be used as the light source.

The parallel light beam from the light source 1 is focused and formed by a linear image forming optical system 2 of the linear image forming device as a linear image LI extending in a main scanning corresponding direction in the vicinity of a deflection-reflecting face 4 of a rotary polygon mirror 3.

The light beam reflected by the deflection-reflecting face 4 is incident to the image forming optical system as a deflected light beam when the rotary polygon mirror 3 is rotated around an axis 3A thereof.

The image forming optical system is constructed by a so-called fθ lens composed of two lenses 5 and 6 and focuses and forms the deflected light beam as an image of a light spot on a scanned face 7. The scanned face 7 is optically scanned by this light spot. The lens 5 is a single lens composed of cylindrical and planar faces. The lens 6 is a single lens composed of cylindrical and toric faces.

FIG. 6 shows a state in which the optical system of FIG. 5 is developed along an optical path and the secondary scanning direction is set as a vertical direction.

Figure 6A:
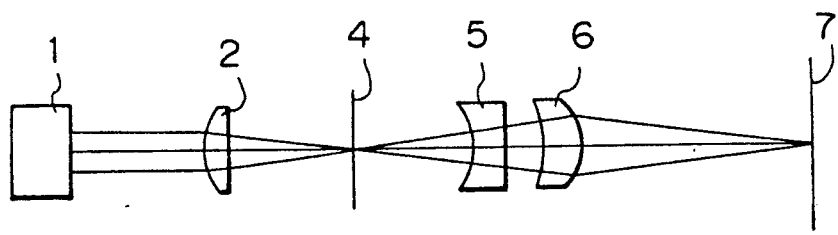
FIGS. 6a and 6b are views for explaining the principle of the present invention.

FIG. 6a shows a state in which the light from the light source device 1 is focused and formed as a linear image in the position of the deflection-reflecting face 4 by the operation of the linear image forming optical system 2 of the linear image forming device. The lenses 5 and 6 constituting the image forming optical system set the start point of the deflection by the deflection-reflecting face 4 and the scanned face 7 in an approximately conjugate relation in geometrical optics with respect to the secondary scanning direction. In this case, the linear image is formed on the scanned face 7.

Figure 6B:
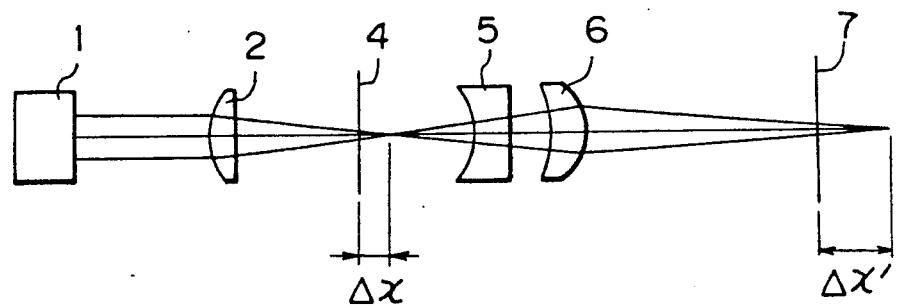

However, as shown in FIG. 6b, when the image forming position of the linear image is shifted by a distance ΔX, the image position in the secondary scanning direction provided by the image forming optical system is shifted by a distance ΔX'. As is well known, the following relation, $$\Delta X' = \beta^2 \cdot \Delta X$$

is formed between these displacing distances $\Delta X$ and $\Delta X'$ where a lateral magnification with respect to the secondary scanning direction in the image forming optical system is set to $\beta$.

The concrete data with respect to the image forming optical system will next be described.

In the following description, reference numeral $R_{iX}$ designates a radius of curvature (the radius of curvature seen from the secondary scanning direction) of an i-th lens face in the main scanning direction from the side of the deflection-reflecting face 4 onto the scanned face side. Reference numeral $R_{iY}$ designates a radius of curvature (the radius of curvature seen from the main scanning direction) of the i-th lens face in the secondary scanning direction. Reference numeral $d_i$ designates a distance of the i-th lens face from the side of the deflection-reflecting face 4. Reference numeral $n_j$ designates a refractive index of a j-th lens from the deflection-reflecting face. By using these reference numerals, the following data are provided.

| i | $R_{iX}$ | $R_{iY}$ | $d_I$ | j | $n_J$ |
|---|---|---|---|---|---|
| 1 | −107.774 | ∞ | 5.672 | 1 | 1.71221 |
| 2 | ∞ | ∞ | 10.966 | | |
| 3 | ∞ | −52.565 | 6.807 | 2 | 1.675 |
| 4 | −45.569 | −12.052 | | | |

In this case, the combined focal distance in the main scanning direction $f_M$ is 100, a brightness F/No=54.7, a deflection angle $2\theta = 67.8$ degrees, the lateral magnification in the secondary scanning direction $\beta = -4.12$, the combined focal distance in the secondary scanning direction $f_S = 22.698$, and a ratio $R/f_M$ of the focal distance $f_M$ and a radius R of an inscribed circle of the rotary polygon mirror 3 is $-0.132$. The above refractive index is provided when the light beam from the light source device 1 has a wavelength 780 nm. An angle $\alpha$ between the optical axis of the image forming optical system and the main light beam incident onto the deflection-reflecting face of the rotary polygon mirror is 60 degrees.

Figure 7:
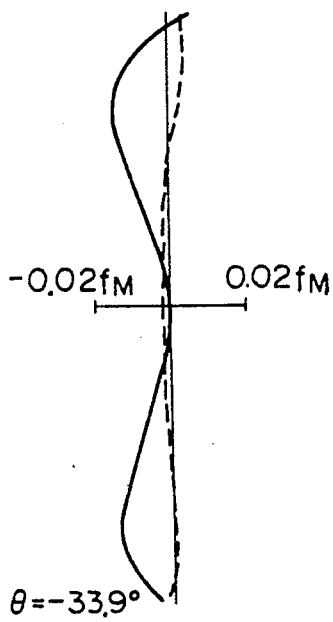
FIGS. 7 to 9 are diagrams for explaining the removal of the curvature of a field in the secondary scanning direction in the embodiments of the present invention.

FIG. 7 shows the curvature of a field caused by the image forming optical system when the light beam from the light source device 1 is focused and formed as an image by the linear image forming optical system 2 of the linear image forming device closely in the vicinity of the deflection-reflecting face 4, as shown in FIG. 6a. A broken line shows a field curvature in the main scanning direction and a solid line shows a field curvature in the secondary scanning direction.

The embodiments of the optical scanner in the present invention in FIGS. 5 to 7 will be further described in detail.

FIG. 1a shows a linear image forming device in the first embodiment of the present optical scanner. The linear image forming device is constituted by a linear image forming optical system composed of the transparent elastic parallel plate 20 and the cylindrical lens 21, a deforming means 15A and a controller 17A as a control means. A known electrostrictive element and a known magnetostrictive element can be used as the deforming means. In accordance with the necessity, it is possible to utilize a mechanism for increasing a displacement such as a lever, etc. as a portion of the deforming means so as to realize a deforming amount required for the elastic parallel plate 20. The elastic parallel plate 20 is flexed in accordance with an electric or magnetic signal applied to the deforming means so that the combined focal distance of the linear image forming optical system can be changed.

When the image forming relation shown in FIG. 6a is formed, it is assumed that no deforming force is applied to the elastic parallel plate 20 and the radii of curvature of the respective faces of the elastic parallel plate 20 are infinite. At this time, since $f_1 = \infty$, the F in the formula (2) becomes $f_2$. The value of F at this time is assumed to be $F_0$.

In the case in which the combined focal distance of the linear image forming optical system is set to F' when the elastic parallel plate 20 is flexed in the shape of an arc, the image forming position of the linear image at this time is shifted by $$\Delta X = F_0 - F' \quad (2)$$

from the image forming position thereof when the combined focal distance is $F_0$. The change $\Delta X'$ in position of the formed image caused by the image forming optical system is provided as follows by using this shift amount $\Delta X$ and the lateral magnification $\beta$ of the image forming optical system mentioned above.

$$\Delta X' = \beta^2 \Delta X$$

This formula becomes the following formula (3) by using the formula (2).

$$\Delta X' = \beta^2 (F_0 - F') \quad (3)$$

When the formula (3) is solved with respect to the $f_1$ by using $F_0 = f_2$, $F' = f_1 \cdot f_2/(f_1 + f_2 - D)$, the following formula (4) is provided.

$$f_1 = \{(\beta^2/\Delta X')f_2 - 1\} \cdot (f_2 - D) \quad (4)$$

Accordingly, when there is the change $\Delta X'$ caused by the curvature of a field in the secondary scanning direction, the radius of curvature for correcting this change can be calculated by setting the $\Delta X'$ in the formula (4) to $-\Delta X'$.

When the focal distance of the cylindrical lens 21 $f_2 = 200$, $D = 10$, the refractive index of the elastic parallel plate 20 $n = 1.5$ and the thickness $d = 3$, it is sufficient to set the above radius of curvature $r = 380.189$ with respect to $\beta = 4.12$ when the curvature of the filed in the secondary scanning direction set as $-1.5$ for example is corrected.

Since the curvature of the field in the secondary scanning direction in the image forming optical system is definitely determined, the radius of curvature of the elastic parallel plate 20 for correcting this curve is determined in accordance with the curvature of the field in the secondary scanning direction with respect to each main scanning position. In accordance with this determination, the magnitude of the deforming force for realizing this radius of curvature is also determined. Therefore, the curvature of the field in the secondary scanning direction can be effectively removed by storing a corresponding relation between the main scanning position and the deforming force to the controller 17A in advance, by detecting the main scanning position by a synchronization clock signal for controlling the optically scanning operation in accordance with the deflection of the deflected light beam, and by controlling the operation of the deforming means 15A by the controller 17A.

Figure 8A:
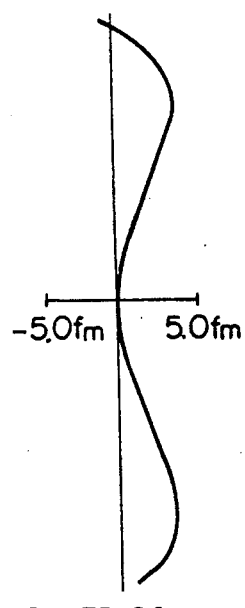

When the field curvature to be corrected in the secondary scanning direction is provided as shown by a solid line in FIG. 7, the change in the above radius r of curvature is provided as shown in FIG. 8a.

The control means is constructed by a scanning-start detector for detecting the start of each scanning cycle over the scanned face with the deflected light beam, a clock generator responsive to the signal from the scanning-start detector for generating a pulse signal, and a controller 17A responsive to the pulse signal from the clock generator for controlling the deforming means 15A.

The scanning-start detector is positioned in an optical path of the deflected light beam deflected by the rotary polygon mirror 3 when one scanning cycle is initiated. Each time the light beam from the light source device 1 hits the scanning-start detector, the scanning-start detector generates a signal. The generated signal is fed to the clock generator which then issues the pulse signal. The controller 17A which received the pulse signal controls the deforming means 15A in synchronization with the rotation of the rotary polygon mirror 3.

The controller 17A comprises an address generator for generating an address signal in response to the pulse signal from the clock generator, a read-only memory addressable by the address signal for issuing a stored signal, a digital-to-analog converter for converting the signal from the read-only memory into an analog signal, and an amplifier for amplifying the analog signal and applying the amplified analog signal to the deforming means 15A.

The clock generator is responsive to the signal from the scanning-start detector for generating a pulse signal at predetermined intervals. The pulse signal is applied to the address generator which generates an address signal fed to the read-only memory (ROM). In the ROM there are stored signals corresponding to amounts of the field curvature to be corrected in the secondary direction with respect to each main scanning position which is defined by the number of pulses fed to the address generator from the clock generator. The ROM issues the stored signals at constant intervals in response to the address signal. The signal from the ROM is converted by the digital-to-analog (D/A) converter into an analog signal representing a small voltage. The D/A converter is driven by the clock generator in synchronization with reception of the signal from the ROM. The small voltage from the D/A converter is amplified by a voltage amplifier to drive the deforming means 15A.

Figure 2:
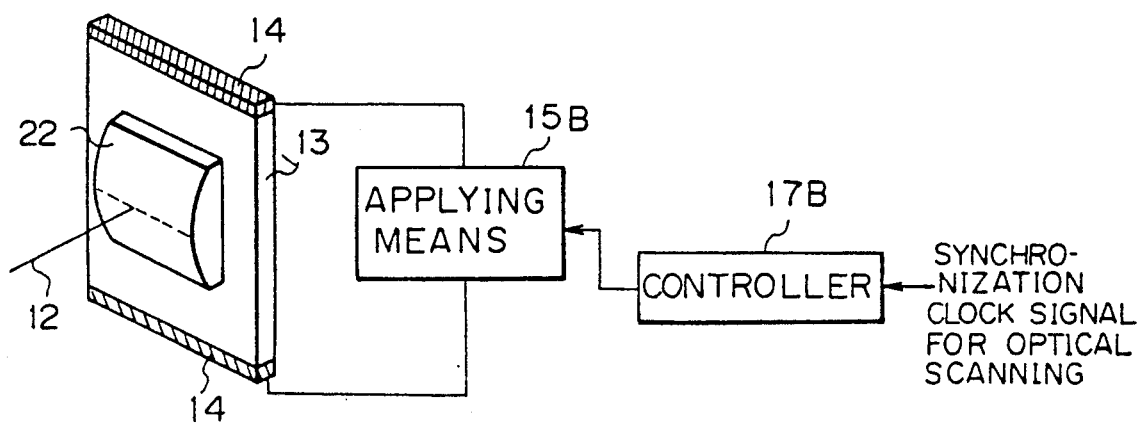

FIG. 2 shows the linear image forming device of the optical scanner in the second embodiment of the present invention.

The cylindrical lens 22 as the linear image forming optical system of the linear image forming device is adhered to a transparent conductive high polymer film 13 by a transparent adhesive. A pair of electrodes 14 are disposed in the transparent conductive high polymer film 13 so as to apply a voltage between the electrodes 14 by an applying means 15B.

Figure 8B:
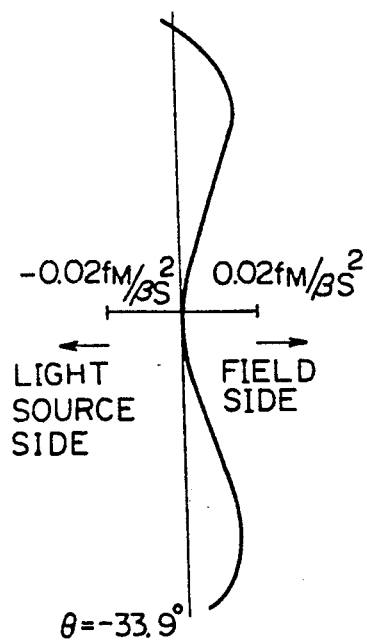

When the voltage is applied between the electrodes 14, the transparent conductive high polymer film is displaced and the cylindrical lens 22 is also displaced by an amount equal to the displacing amount of the high polymer film in the direction of an optical axis 12. The moving amount of the cylindrical lens 22 is equal to the displacing amount $\Delta X$ of the linear image. This displacing amount $\Delta X$ causes the displacing amount $\Delta X'$ of the image forming position of the light spot. These displacing amounts have the above-mentioned relation $\Delta X' = \beta^2 \Delta X$. When the amount (see FIG. 7) of the field curvature in the secondary scanning direction in the image forming optical system is set to W(z) in accordance with the image forming position z in the main scanning direction, it is sufficient to set $\Delta X' = -W(z)$ such that the cylindrical lens 22 is displaced in accordance with the image forming position z and the amount W(z) of the field curvature in secondary scanning direction is canceled by the displacing amount $\Delta X'$ of the image forming position of the light spot by the displacement of the cylindrical lens 22. Thus, it is sufficient to displace the cylindrical lens 22 by an amount $-W(z)/\beta^2$. This displacing amount is shown in FIG. 8b.

There is a functional relation between the displacing amount of the cylindrical lens 22 and the voltage applied by the applying means 15B. This functional relation can be experimentally determined in advance.

The image forming position z of the light spot is determined by time corresponding to the optically scanning operation. The image forming position z is determined by corresponding this position to a synchronization clock signal for synchronization of the optically scanning operation. The controller 17B as the control means shown in FIG. 2 stores in advance the relation between each image forming position and the voltage V(z) which can displace the cylindrical lens 22 by the amount $-W(z)/\beta^2$. The voltage applied to the transparent conductive high polymer film 13 is controlled by the controller 17B in response to the stored content thereof in accordance with the above voltage V(z) in synchronization with the optical scanning operation. By such a construction, the curvature of the field in the secondary scanning direction can be removed.

The linear image forming device of the second embodiment is provided with a control means similar to that described in the first embodiment.

Figure 3:
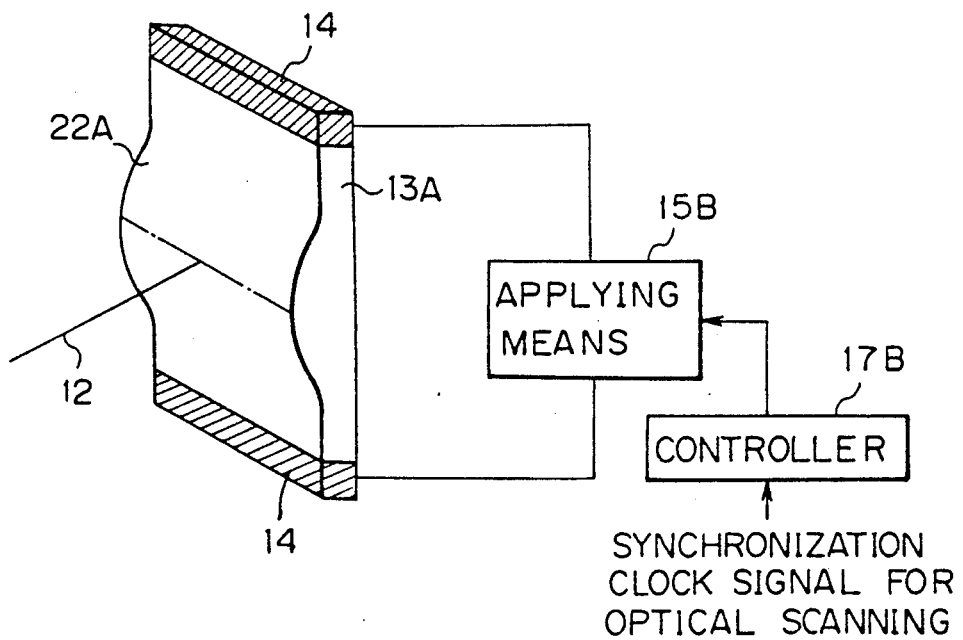

In FIG. 3, showing the linear image forming device of the optical scanner in the third embodiment of the present invention, reference numeral 22A designates a cylindrical lens as the linear image forming optical system.

This cylindrical lens 22A is constructed by a transparent conductive high polymer material. Concretely, a central portion of the transparent conductive high polymer film 13A is formed in the shape of a cylindrical lens. A pair of electrodes 14 are disposed in the transparent conductive high polymer film 13A and a voltage can be applied by an applying means 15B between these electrodes. When this voltage is applied, the transparent conductive high polymer film 13A is displaced and the cylindrical lens 22A is also displaced by an amount equal to the displacing amount of the high polymer film in the direction of the optical axis 12. The moving amount of the cylindrical lens 22A is equal to the displacing amount $\Delta X$ of the linear image. Accordingly, the curvature of the field in the secondary scanning direction can be removed by displacing the cylindrical lens 22A by the amount $-W(z)/\beta^2$ in accordance with the amount W(z) of the field curvature in the secondary scanning direction in the image forming optical system. This displacing amount is provided as shown in FIG. 8b, which is similar to the case of the displacing amount in the above-mentioned embodiment shown in FIG. 2.

There is a functional relation between the displacing amount of the cylindrical lens 22A and the voltage applied by the applying means 15B. This functional relation can be experimentally determined in advance. The image forming position z is determined by corresponding this position to a synchronization clock signal for synchronization of the optically scanning operation. The controller 17B stores in advance the relation between each image forming position z and the voltage V(z) which can displace the cylindrical lens 22A by the amount $-W(z)/\beta^2$. The voltage applied to the transparent conductive high polymer film 13A is controlled by the controller 17B in response to the stored content thereof in accordance with the above voltage V(z) in synchronization with the optically scanning operation. By such a construction, the curvature of the field in the secondary scanning direction can be removed.

The linear image forming device of the third embodiment is provided with a control means similar to that described in the first embodiment.

Figure 4:
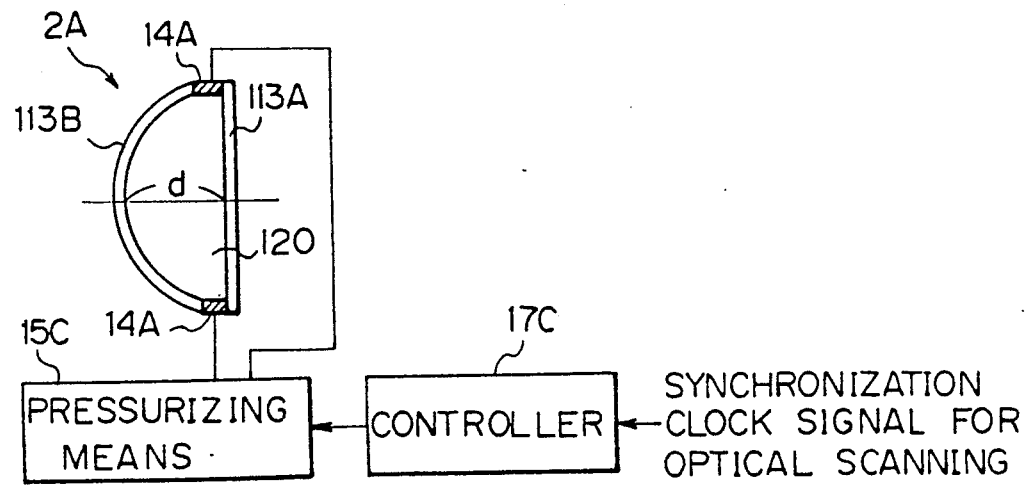

FIG. 4 shows the linear image forming device of the optical scanner in the fourth embodiment of the present invention. A cylindrical lens 2A as linear image forming optical system has flat and convex faces and is constructed by a flat transparent base plate 113A, a transparent thin film 113B, spacers 14A, and liquid 120 sealed within a space formed by the base plate 113A, the thin film 113B and the spacers 14A.

The base plate 113A, the thin film 113B and the spacers 14A constitute an outer shell member and the thin film 113B is flexible. When a deforming force provided by a pressurizing means 15C as a deforming means is applied as a pressurizing force between the spacers 14A, the deforming force is mainly absorbed by the thin film 113B and the liquid 120 so that the cylindrical lens 2A is deformed. The radius of curvature of the thin film 113B is changed by this deformation of the cylindrical lens 2A.

When the thin film 113B is directed onto the side of the rotary polygon mirror, the focal distance $f_{cv}$ of the cylindrical lens 2A is provided by the following formula, $$f_{cv}=R/(n-1) \quad (5)$$

by using the radius R of curvature of the thin film 113B and the refractive index n of the liquid 120. In contrast to this, when the thin film 113B is directed onto the side of the light source device, the distance $bf_{cv}$ from the base plate 113A to the focal point is provided by the following formula, $$bf_{cv}=[R/(n-1)]-[d/n] \quad (6)$$

where reference numeral d designates the distance between lens faces of the cylindrical lens 2A.

Figure 8C:
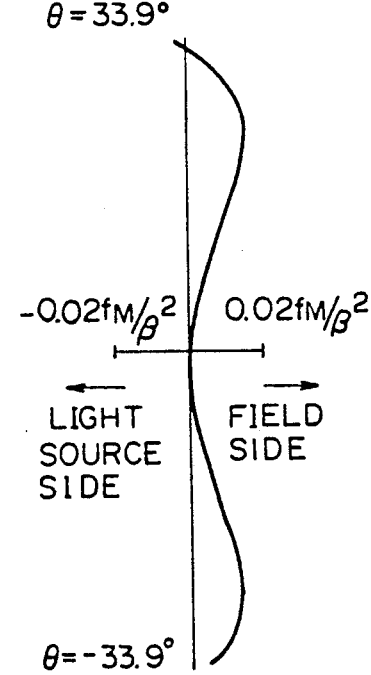

The radius R of curvature and the distance d are definitely determined by the voltage V applied to the pressurizing means 15C from the controller 17C as the control means. The value of the voltage V is stored to the controller 17C as a function of the main scanning position z (which can be specified by a synchronization clock signal) in accordance with the amount of the field curvature (see FIG. 7) to be corrected in the secondary scanning direction. Then, the above $f_{cv}$ or $bf_{cv}$ is changed in accordance with this stored content. By such a construction, the curvature of the field can be corrected. The curve shown in FIG. 8c is a curve provided in accordance with the above $bf_{cv}$ calculated by the following formula, $$bf_{cv}=-W(z)/\beta^2$$

to correct the curvature of the field when the curvature of the field shown by a solid line in FIG. 7 is set to W(z).

The linear image forming device of the fourth embodiment is provided with a control means similar to that described in the first embodiment.

Figure 9:
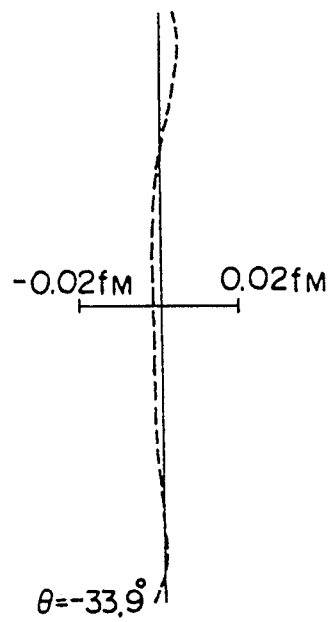

FIG. 9 shows a removed state of the field curvature in the secondary scanning direction in the respective embodiments described with reference to FIGS. 1 to 4.

The linear image forming optical system has no power in the main scanning direction in the respective embodiments so that the above removal of the field curvature in the secondary scanning direction does not exert any influence on the field curvature in the main scanning direction. Accordingly, after the field curvature in the secondary scanning direction is removed, the same field curvature as that shown in FIG. 7 is left with respect to the main scanning direction. However, there is practically no special problem since the curvature of the field in the main scanning direction can be corrected by electrically correcting a light amount with respect to printing in the light source device when optical information is written.

As mentioned above, in accordance with the novel optical scanner of the present invention constructed as above, the curvature of a field in the secondary scanning direction can be removed easily and reliably and the diameter of a light spot can be made uniform so that it is possible to perform an optically scanning operation of high density. In the above embodiments, the curvature of the field is completely removed, but the image forming position of a linear image provided by the linear image forming device may be approximately displaced such that the curvature of the field is substantially removed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:
   a light source device;
   a linear image forming device for forming an approximately parallel light beam from the light source device as a linear image extending in a main scanning corresponding direction;
   a rotary polygon mirror having a deflection-reflecting face in the vicinity of the image forming position of said linear image; and
   an image forming optical system arranged between the rotary polygon mirror and a scanned face and setting the scanned face and a deflecting start point of said deflection-reflecting face in an approximately conjugate relation in geometrical optics with respect to a secondary scanning direction, said image forming optical system forming the deflected light beam from said deflection-reflecting face as an image of a light spot on said scanned face,
   said linear image forming device having a transparent elastic parallel plate, a cylindrical lens, deforming means for flexing said elastic parallel plate in the shape of an arc by applying a deforming force thereto to change a radius of curvature of a face of the elastic parallel plate, and control means for controlling the application of said deforming force in synchronization with an optically scanning operation by said deflected light beam.

2. An optical scanner as claimed in claim 1, wherein an image provided by the image forming optical system with respect to the linear image by the linear image forming device is formed on the scanned face with respect to the secondary scanning direction.

3. An optical scanner as claimed in claim 2, wherein, when the image forming position of the linear image provided by the linear image forming device is changed on an optical path, the image forming position of the linear image provided by the image forming optical system is also displaced in accordance with a longitudinal magnification of the image forming optical system.

4. An optical scanner as claimed in claim 3, wherein the curvature of a field is corrected by controlling the application of the deforming face to the elastic parallel plate through the change in image forming position of the linear image.

5. An optical scanner comprising:
a light source device;
a linear image forming device for forming an approximately parallel light beam from said light source device as a linear image extending in a main scanning corresponding direction;
a rotary polygon mirror having a deflection-reflecting face in the vicinity of the image forming position of said linear image; and
an image forming optical system arranged between the rotary polygon mirror and a scanned face and setting the scanned face and a deflecting start point of said deflection-reflecting face in an approximately conjugate relation in geometrical optics with respect to a secondary scanning direction, said image forming optical system forming the deflected light beam from said deflection-reflecting face as an image of a light spot on said scanned face,
said linear image forming device having a cylindrical lens formed by sealing a transparent liquid into the interior of a transparent and flexible outer shell member, said cylindrical lens being deformed by an external deforming force so as to change a focal distance thereof, deforming means for applying said deforming force to said cylindrical lens by an electrical or magnetic operation, and control means for controlling the application of said deforming force in synchronization with an optically scanning operation by said deflected light beam.

6. An optical scanner as claimed in claim 5, wherein an image provided by the image forming optical system with respect to the linear image by the linear image forming device is formed on the scanned face with respect to the secondary scanning direction.

7. An optical scanner as claimed in claim 6, wherein, when the image forming position of the linear image provided by the linear image forming device is changed on an optical path, the image forming position of the linear image provided by the image forming optical system is also displaced in accordance with a longitudinal magnification of the image forming optical system.

8. An optical scanner as claimed in claim 7, wherein the image forming position of the linear image is changed by the change in focal distance by the external deforming force.

* * * * *